United States Patent [19]

Jones

[11] Patent Number: 4,962,630
[45] Date of Patent: * Oct. 16, 1990

[54] ROTARY CUTTING MEMBER WITH FLEXIBLE FILAMENTS FOR USE WITH LAWNMOWERS AND THE LIKE

[75] Inventor: Dallas W. Jones, New Hartford, N.Y.

[73] Assignee: Trim-A-Lawn Corporation, Mandeville, N.Y.

[ * ] Notice: The portion of the term of this patent subsequent to Apr. 11, 2006 has been disclaimed.

[21] Appl. No.: 199,359

[22] Filed: May 26, 1988

[51] Int. Cl.⁵ ..................... A01D 34/72; A01D 34/73
[52] U.S. Cl. ....................................... 56/12.7; 56/295
[58] Field of Search .................. 56/295, 12.7, 255; 30/276, 347, 348

[56] References Cited

U.S. PATENT DOCUMENTS

| | | | |
|---|---|---|---|
| 2,924,059 | 2/1960 | Beeston, Jr. | 56/295 |
| 3,176,455 | 4/1965 | Buchanan | 56/295 |
| 3,191,371 | 6/1965 | Brewer | 56/295 |
| 3,208,209 | 9/1965 | Dunlap et al. | 56/295 |
| 3,321,026 | 5/1967 | Hubbard | 172/45 |
| 3,391,524 | 7/1968 | Nickoloff et al. | 56/320.1 |
| 3,496,705 | 2/1970 | Kobey | 56/17.5 |
| 3,805,499 | 4/1974 | Woelffer et al. | 56/320.2 |
| 3,895,440 | 7/1975 | Pittinger, Jr. | 30/347 |
| 3,988,810 | 11/1976 | Emery | 56/128 |
| 4,054,992 | 10/1977 | Ballas et al. | 20/276 |
| 4,058,959 | 11/1977 | Moss et al. | 56/295 |
| 4,062,115 | 12/1977 | Lee | 30/276 |
| 4,107,907 | 8/1978 | Rutherford | 56/320.2 |
| 4,112,653 | 9/1978 | Ballas et al. | 56/295 |
| 4,126,990 | 11/1978 | Fisher et al. | 56/295 |
| 4,187,598 | 2/1980 | Pittinger, Jr. | 29/513 |
| 4,232,505 | 11/1980 | Walto | 56/320.1 |
| 4,249,310 | 2/1981 | Secoura et al. | 30/276 |
| 4,258,536 | 5/1981 | Kidd et al. | 56/17.5 |
| 4,282,653 | 8/1981 | Comer et al. | 56/12.7 X |
| 4,295,324 | 10/1981 | Frantello et al. | 56/12.7 |
| 4,310,999 | 1/1982 | Onoue | 56/295 |
| 4,357,789 | 11/1982 | Rodish | 56/295 |
| 4,362,007 | 12/1982 | Kennedy et al. | 56/295 |
| 4,378,668 | 5/1983 | Gullett | 56/255 |
| 4,466,235 | 8/1984 | Cole | 56/125 |
| 4,513,563 | 4/1985 | Roser et al. | 56/295 |
| 4,550,498 | 11/1985 | Oliver | 56/12.7 X |
| 4,711,077 | 12/1987 | Kutsukake et al. | 56/255 |
| 4,726,176 | 2/1988 | McGrew | 56/12.7 |
| 4,819,416 | 4/1989 | Jones | 56/12.7 |

FOREIGN PATENT DOCUMENTS

| | | |
|---|---|---|
| 2556553 | 6/1977 | Fed. Rep. of Germany . |
| 2282783 | 3/1976 | France . |
| 103277 | 2/1924 | Switzerland . |
| 2036524 | 7/1980 | United Kingdom ................ 56/295 |

Primary Examiner—Hoang C. Dang
Attorney, Agent, or Firm—Shlesinger & Myers

[57] ABSTRACT

The present invention discloses an apparatus for cutting grass or vegetation and the like, which includes a rotary cutting member. The rotary cutting member includes a hub and a plurality of arms extending therefrom. Each arm includes a line holder for receiving a flexible cutting filament. The flexible cutting filament includes first and second cutting elements, and is positioned such that first element is positioned above and laterally offset from the second element. Each arm is shaped so as to form an air-foil. The air-foil creates a low pressure area above the blade which facilitates lifting the grass upward in the direction of the lawnmower blade.

11 Claims, 2 Drawing Sheets

ROTARY CUTTING MEMBER WITH FLEXIBLE FILAMENTS FOR USE WITH LAWNMOWERS AND THE LIKE

RELATED APPLICATIONS

The assignee of the present application is the owner of a design patent application Ser. No. 152,583, filed Feb. 5, 1988, directed to a housing for lawnmowers and the like. The assignee of the present invention is also the owner of utility patent applications Ser. Nos. 080,269, filed July 31, 1987, now abandoned, and 156,597, filed Feb. 17, 1988, U.S. Pat. No. 4,819,416. Additionally, the assignee of the present application is the owner of a co-pending utility patent application Ser. No. 188,508, filed Apr. 29, 1988, U.S. Pat. No. 4,894,980. Finally, the assignee of the present application is the owner of utility patent application Ser. No. 245,969, filed Sept. 16, 1988, U.S. Pat. No. 4,854,115.

FIELD OF THE INVENTION

This invention pertains to rotary cutting members with flexible filaments that are used with lawnmowers and the like.

BACKGROUND OF THE INVENTION

A number of arrangement have been proposed for cutting blades used in lawnmowers and similar apparatus. The following U.S. Patents discloses a number of known cutting blades: U.S. Pat. No. 3,208,209 Dunlap; U.S. Pat. No. 3,364,500 Fox; U.S. Pat. No. 3,988,810 Emery; U.S. Pat. No. 4,054,992 Ballas; U.S. Pat. No. 4,126,990 Fisher; U.S. Pat. No. 4,187,598 Pittinger; U.S. Pat. No. 4,295,324 Frantello; U.S. Pat. No. 4,357,789 Rodish; U.S. Pat. No. 4,362,007 Kennedy and U.S. Pat. No. 4,513,563 Roser. Further, the German Patent No. 2,556,553 discloses a rotary cutting blade.

An ever increasing concern with consumers is the potential threat of bodily harm or to life that conventional lawnmowers present. The metallic cutting blades customarily used in lawnmowers can permanently disfigure, injure or kill an operator or innocent bystanders. If the operator inadvertently runs over any portion of his body or that of a bystander, such as a foot, that portion of the body could be severely maimed or lost. An alarming number of these types of accidents have been reported around the country. Further, when the operator is removing the grass catcher it is possible that his arms or hands may inadvertently slip under the housing and be injured or severed by the lawnmower blade. Additionally, if the lawnmower blade runs over rocks, metal rods, stakes and the like it will project those objects outwardly with great velocity. These objects could likely strike the operator or an innocent bystander and cause serious bodily injury or death.

As a result of the dangerous nature of conventional lawnmowers, it has been proposed to replace the customary metallic cutting blades with flexible type of filaments commonly found in edgers or trimmers. However, the known cutting blades using flexible filaments have been unable to provide an adequate alternative to the metallic cutting blade.

OBJECTS AND SUMMARY OF THE INVENTION

It is an object of the present invention to provide an improved rotary cutting member having a plurality of flexible filaments forming the cutting blade.

Another object of the present invention is to provide a rotary cutting member that will significantly reduce the danger of bodily harm associated with the use of lawnmowers and the like.

A further object of the present invention is to provide a rotary cutting member that creates a lower pressure area along its upper surface for raising up grass and vegetation or the like and directing cut grass or vegetation upwardly into the lawnmower bag, thereby increasing the effectiveness of the mower.

Yet another object of the present invention is to provide means for readily replacing the flexible cutting filaments once they have worn out.

Another object of the present invention is to provide a rotary cutting member which has a weight embedded therein for opposing and moderating fluctuations in the revolutions per minute (rpm) of the output shaft of the lawnmower engine.

Still another object of the present invention is to provide a rotary cutting blade that maintains a constant rpm level, thereby ensuring an even cut of the entire lawn.

A further object of the present invention is to provide a flexible cutting filament having spaced cutting elements.

Yet another object of the present invention is to provide a rotary cutting member with a weight embedded therein for the ease of starting the lawnmower engine.

Yet a further object of the present invention is to provide a rotary cutting member having a hub and a plurality of arms extending therefrom and a cut-out formed intermediate the adjacent arms for permitting upward air flow therebetween.

In summary, the present invention includes a rotary cutting blade having a plurality of flexible filaments extending therefrom. The flexible filaments form a cutting blade for effectively cutting the grass but present no damage of bodily injury to the operator of any bystanders.

DETAILED DESCRIPTION OF THE DRAWINGS

The above and other objects and advantages and novel features of the present inventions will become apparent from the following detailed description of the preferred embodiment of the invention illustrated in the accompanying drawings, in which.

DETAILED DESCRIPTION OF THE INVENTION

Figure 1:
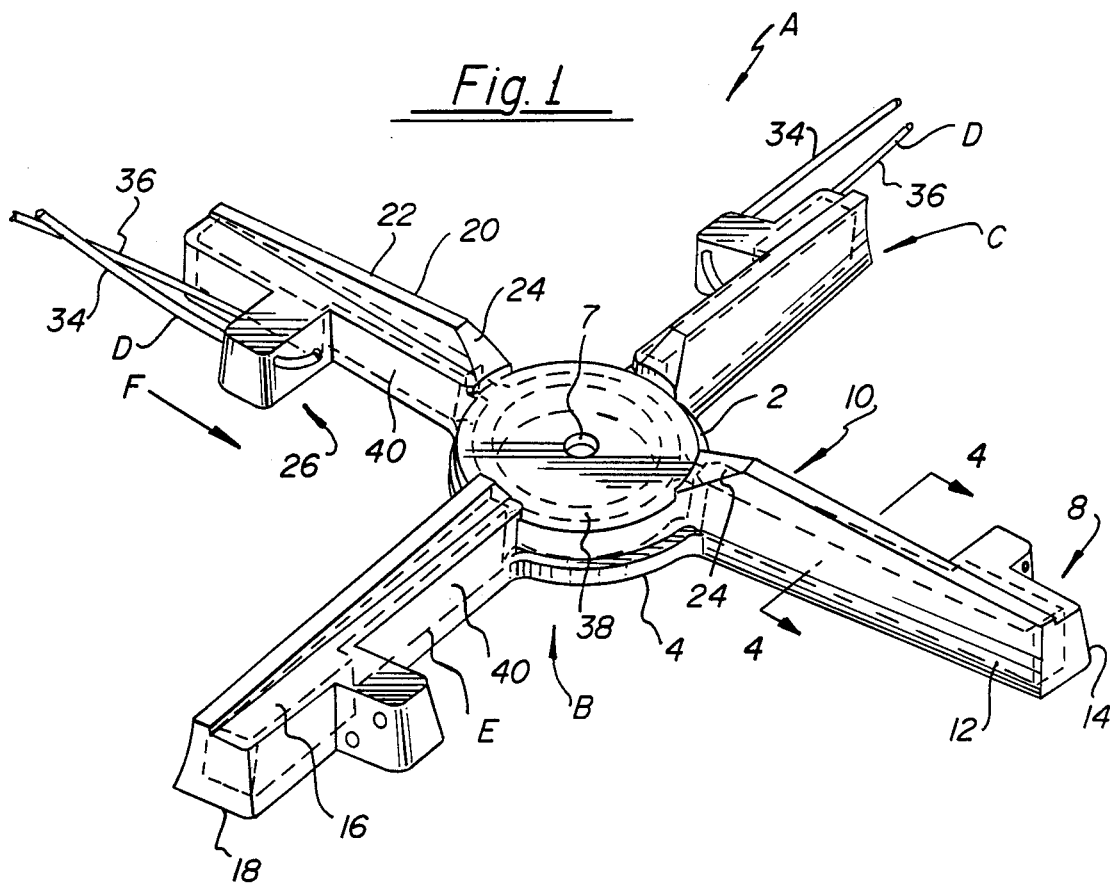
FIG. 1 is a perspective view of the rotary cutting member formed in accordance with the present invention, showing the weight in phantom lines.

Referring to FIG. 1, a rotary cutting blade A includes a hub B, four arms C extending radially outwardly from hub B, and a plurality of flexible cutting filaments D. It is well within the purview of the invention to vary the number of arms C extending from rotary cutting member A. As shown by the phantom lines in FIG. 1, rotary cutting blade has embedded therein a weight E from imparting necessary inertia to start the lawnmower engine (not shown).

Figure 2:
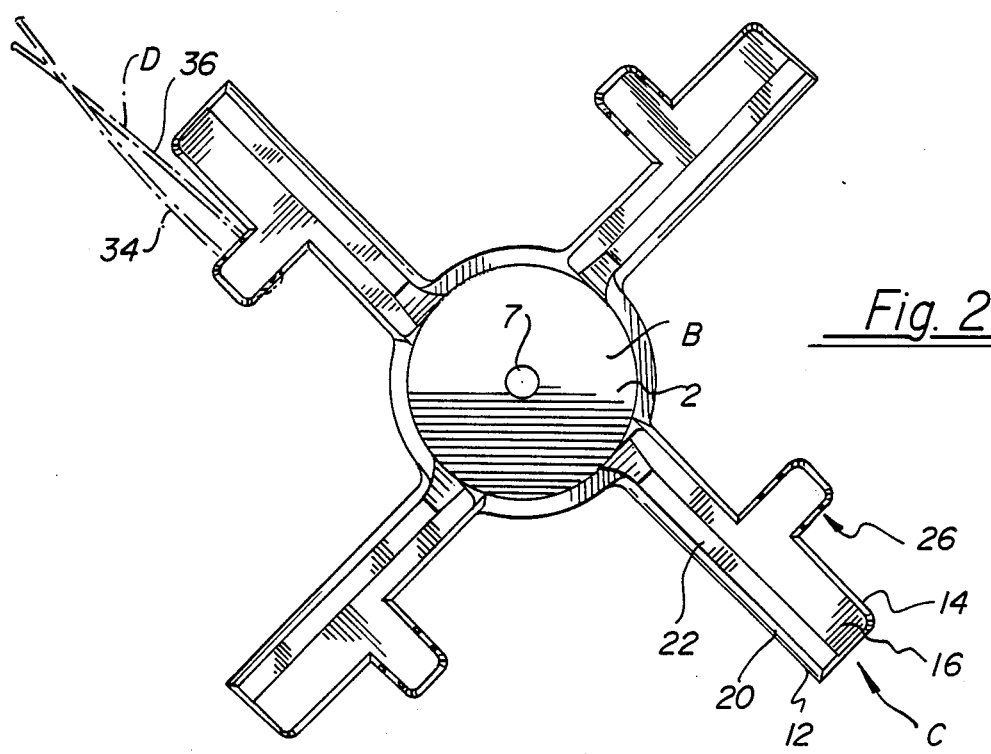
FIG. 2 is a top plan view of the rotary cutting member shown in FIG. 1.
Figure 3:
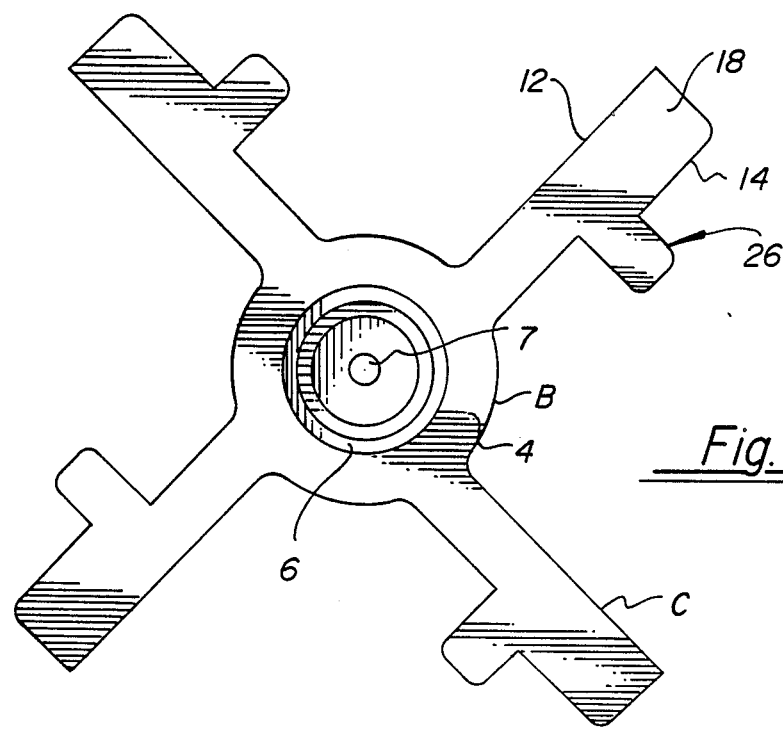
FIG. 3 is a bottom plan view of the rotary cutting member shown in FIG. 1.

The rotary cutting blade A includes upper and lower surfaces 2 and 4, respectively. The upper surface 2, best seen in FIG. 2, is positioned adjacent the housing of the lawnmower (not shown), when the rotary Cutting blade A is in operation. The lower surface 4, best seen in FIG. 3, is positioned adjacent the ground when the rotary cutting blade A is in operation. The lower surface 4 is substantially planar and includes a recess 6 formed about the center of rotary blade A. The recess 6 cooperates with bore 7, best seen in FIG. 2, formed in hub B for accommodating conventional fasteners for securing the rotary cutting blade A to the lawnmower housing (not shown). The rotary cutting blade A may be formed from Xenoy or a suitable conventional material. Xenoy is a plastic unreinforced polycarbonate based polymer blend.

The arms C are spaced equidistantly from the outer periphery of the hub B, and are offset relative to each other to allow unobstructed flow of air towards the center. Further, each arm C extends outwardly from hub B to the same distance. The arms C include first and second ends 8 and 10, and leading and trailing surfaces 12 and 14, respectively. First end 8 is removed from hub B while second end 10 is positioned adjacent thereto. The ends B are raised slightly upwardly above the lower surface 4 of hub B, for allowing the hub B to hit the ground first before the arms C, if the lawnmower goes into a hole or the like.

Figure 4:
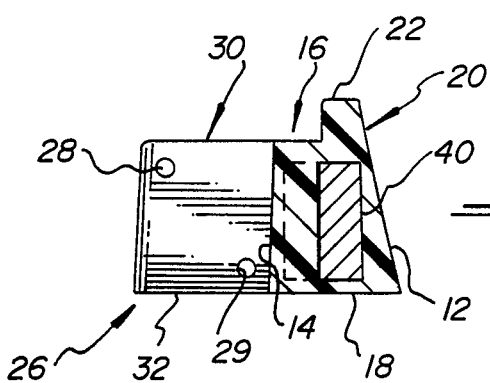
FIG. 4 is a cross-sectional view of the rotary cutting member taken along line 4—4 in FIG. 1.

As best shown in FIG. 4, arms C include a top surface 16 and a bottom surface 18. The top surface 16 further includes an upwardly extending shoulder 20 having an inclined surface 22. The inclined surface 22 extends from first end 8 to second end 10 of arms C, and includes a bevelled surface 24 which joins the hub B.

A line holder 26 extends outwardly from the trailing surfaces 14 of arms C. The line holder 26 includes a pair of upper and lower passageways 28 and 29, for receiving flexible cutting filaments D, as best seen in FIG. 4. The line holder includes top and bottom surface 30 and 32, respectively. The top and bottom surfaces 30 and 32 of line holders 26 are flush with the top and bottom surfaces 16 and 18, respectively, of arms C. As best shown in FIG. 4, upper passageway 28 is located adjacent the top surface 30 of line holder 26, and lower passageway 29 is located adjacent the bottom surface 32 of line holder 26. In addition, the passageways 28 and 29 are vertically spaced and laterally offset with respect to one another.

As shown in FIGS. 1 and 2, flexible cutting filaments D include first and second cutting elements 34 and 36, respectively. First cutting element 34 is received in upper passageway 28 away from the trailing surface 14, and the second cutting element 36 is received in lower passageway 29 directly adjacent the trailing surface 14 of arms C. During operation, first cutting element 34 acts as an air-foil for creating a low pressure area above upper surface 2 of rotary cutting member A. This results in a partial vacuum causing the grass or the vegetation to be raised upwardly, thereby enabling the cutting blade A to readily cut the same. In addition, the partial vacuum directs the cut-grass upwardly into the grass catcher (not shown). The second cutting element 36 positioned in lower passageway 29 is used to cut the grass. Therefore, the elements 36 extending from line holders 26 of arms C form a continuous round blade when rotary cutting member A is in motion.

As shown by the phantom lines in FIG. 1, the cutting member A has a rotary weight E embedded therein. The weight E includes a ring 38 and weight-arms 40 extending radially outwardly from ring 38.

The number of weight-arms 40 is preferably equal to the number of arms C extending from the hub B, such that at least one weight-arm is housed within each arm C. As shown in FIG. 1, the weight-arms 40 extend about the entire length of arms C. The weight may be formed from a suitable material, such as a metal, and is provided to increase the moment of inertia of the cutting blade A.

The moment of inertia is proportional to the weight of the particles of the cutting blade A by the square of their distance from the axis of rotation. Thus, by positioning the weight-arms 40 to a farthest point from hub B, the moment of inertia of the rotary cutting blade A is maximized. The greater the moment of inertia of a body, the less susceptible it is to variation in speeds. Therefore, the greater the moment of inertia of the rotary cutting blade A, the less susceptible it is to the fluctuations in the rpm level of the output shaft of a lawnmower engine. Thus, the rotary cutting blade A will maintain a constant rpm level during operation of the lawnmower. This feature of the present invention ensures an even cut over the entire lawn. The size and shape of the weights can be varied to accommodate various specifications.

In addition, since the shape of the rotary weight corresponds to the shape of the cutting member A, the moment of inertia of the entire cutting member A is increased, which facilitates starting of the lawnmower engine.

As best seen in FIG. 4, the trailing surfaces 14 of arms C are substantially vertical, but the leading surfaces 12 are inclined downwardly such that leading surfaces 12 form an acute angle with the bottom surface 18. This specific configuration of leading surfaces 12 and the inclined surface 22 of arms, forms another air-foil for creating a low pressure area above upper surface 2 of rotary cutting member A. This results in a partial vacuum which draws air and grass inside and towards the center of the rotary cutting member A, thereby raising the grass upwardly which allows a more even cut when the lower cutting elements 36 contact the grass or vegetation.

The flexible cutting filaments D can be readily removed from the corresponding arm C to permit their replacement. As shown in FIG. 1, a force F applied as shown by the arrow, will cause the flexible filament D to slide into the passageways 28 and 29, which will permit the operator to readily pull out the filament D from the corresponding arm C. In inserting a new filament D, the operator needs only to align one end of the filament D with one of the passageways 28 and 29, and slip the other end of the filament through the other of the passageways, such that one element 34 is positioned above the second element 36.

While there has been herein shown and described preferred form of this invention, it is to be understood that such has been done for purposes of illustration only, and that various changes may be made therein within the scope of the appended claims.

What is claimed is:

1. An apparatus for cutting vegetation and the like, comprising:
   - (a) rotary cutting means having an upper surface and a lower surface;
   - (b) weight means embedded within said rotary cutting means;
   - (c) said rotary cutting means including a hub and a plurality of arm means extending from said hub;
   - (d) a plurality of flexible cutting means;
   - (e) means operably associated with each of said arm means for securing one of said cutting means thereto;
   - (f) said securing means including at least a first passageway having a diameter;
   - (g) each of said flexible cutting means having a diameter less than the diameter of said first passageway for permitting a corresponding flexible cutting means to pass through said first passageway;
   - (h) said weight means including a central section and a plurality of arms extending radially outwardly from said central section;
   - (i) said arms of said weight means corresponding in number to said arm means so that at least one of said arms is embedded in a corresponding arm means;
   - (j) each of said arm means including a first end lying away from said hub and a second end lying adjacent thereto;
   - (k) said securing means lying adjacent said first end of a corresponding arm means;
   - (l) each of said arms extending between said first and second ends and substantially beyond the corresponding securing means;
   - (m) the upper surface of at least a first one of said arm means including a first air-foil means for creating a low pressure zone above the upper surface and extending between said first and second ends thereof; and
   - (n) said first air-foil means comprising a planar surface inclined downwardly from said second end to said first end of said at least one of said arm means.

2. The apparatus of claim 1, wherein:
   - (a) said securing means includes a second passageway; and
   - (b) said first passageway is laterally offset from said second passageway.

3. The apparatus of claim 1, wherein:
   - (a) each of said arm means includes a leading surface and a trailing surface; and
   - (b) said securing means extends outwardly from said trailing surface.

4. The apparatus of claim 2, wherein:
   - (a) said securing means includes an upper surface and a lower surface;
   - (b) said lower surface is adjacent to the ground; and
   - (c) said first passageway is adjacent to said lower surface and said second passageway is away from said lower surface.

5. The apparatus of claim 4, wherein:
   - (a) said securing means includes a second air-foil means for creating a low pressure area above said upper surface; and
   - (b) said second air-foil means includes a flexible filament means positioned in said second passageway.

6. The apparatus of claim 3, wherein:
   - (a) said leading surface includes an upper edge and a lower edge; and
   - (b) said lower edge extends outwardly such that said leading surface forms an acute angle with said trailing surface.

7. The apparatus of claim 6, wherein:
   - (a) at least a second one of said arm means includes a third air-foil means for creating a low pressure zone above said upper surface; and
   - (b) said third air-foil means comprises said leading surface of said at least second arm means.

8. The apparatus of claim 1, wherein:
   - (a) said hub includes a centrally positioned bore;
   - (b) said bore connects said upper surface with said lower surface;
   - (c) said at least first passageway having an axis; and
   - (d) said axis of said first passageway intersects a vertical plane extending through said bore.

9. The apparatus of claim 1, wherein:
   - (a) each of said arm means includes an axis extending radially outwardly from said hub; and
   - (b) said axis of said first passageway runs substantially parallel to said axis of a corresponding arm means.

10. The apparatus of claim 1, wherein:
    - (a) said weight means is formed of a metal.

11. The apparatus of claim 1, wherein:
    - (a) said rotary cutting means is formed of a plastic material.

* * * * *